US012723886B1

(12) United States Patent
Kuo et al.

(10) Patent No.: US 12,723,886 B1
(45) Date of Patent: Sep. 1, 2026

(54) SYSTEM, METHOD, AND INTERFACE FOR SELECTIVE VISUAL DISPLAY OF GUIDED INPUT VEHICLE ROUTING OPTIMIZATION

(71) Applicant: ROUTIFIC SOLUTIONS INC, Vancouver (CA)

(72) Inventors: Marc Kuo, Vancouver (CA); Kevin Lioi, Vancouver (CA); Rodrigo Boos, Vancouver (CA); Szu Ting Fang, Vancouver (CA); Jung Pu Tsui, Vancouver (CA); Jamil Wahid, Vancouver (CA); Andrew Kwok, Vancouver (CA)

(73) Assignee: Routific Solutions Inc., Vancouver (CA)

( * ) Notice: Subject to any disclaimer, the term of this patent is extended or adjusted under 35 U.S.C. 154(b) by 0 days.

(21) Appl. No.: 19/403,481

(22) Filed: Nov. 28, 2025

Related U.S. Application Data

(60) Provisional application No. 63/792,655, filed on Apr. 22, 2025.

(51) Int. Cl.
*G01C 21/36* (2006.01)
*G06F 16/29* (2019.01)

(52) U.S. Cl.
CPC ......... *G01C 21/3614* (2013.01); *G06F 16/29* (2019.01)

(58) Field of Classification Search
CPC ............................ G01C 21/3614; G06F 16/29
See application file for complete search history.

(56) References Cited

U.S. PATENT DOCUMENTS

2017/0268898 A1* 9/2017 Boschker ........... G01C 21/3626

FOREIGN PATENT DOCUMENTS

CN 104677369 B * 2/2018 ......... G01C 21/3484
CN 110793533 A * 2/2020 ......... G01C 21/3614
CN 111678532 B * 10/2023 ......... G01C 21/3664

OTHER PUBLICATIONS

CN104677369B English translation (Year: 2018).*
CN111678532B English translation (Year: 2023).*
CN_110793533_A English translation (Year: 2023).*

* cited by examiner

*Primary Examiner* — Justin S Lee
*Assistant Examiner* — Brandon S Lee
(74) *Attorney, Agent, or Firm* — Norton Rose Fulbright Canada LLP; Maya Medeiros

(57) ABSTRACT

Embodiments generally relate to selective visual display systems, improved user interfaces for capturing guidance input for vehicle routing optimization, and to devices, systems and methods for improved integration of guidance input into a map interface and automated vehicle routing optimization computational system. Systems and methods integrate user-drawn freeform guidance on a map interface into vehicle routing optimization. A map interface receives a freeform shape, which is represented as an ordered polyline and translated into spatial constraints via shape-adherence measures and optionally a buffered corridor. A solver generates routes that minimize travel cost and penalties for deviation from the guidance, treating the guidance as soft constraints with tunable weights. Adjustments to the shape trigger real-time recomputation, optionally with warm starts. Historical user inputs and accepted routes inform adaptive weighting and suggested guidance for future tasks.

19 Claims, 8 Drawing Sheets

SYSTEM, METHOD, AND INTERFACE FOR SELECTIVE VISUAL DISPLAY OF GUIDED INPUT VEHICLE ROUTING OPTIMIZATION

CROSS-REFERENCE TO RELATED APPLICATIONS

This application claims priority to and the benefit of U.S. Provisional Patent Application No. 63/792,655 filed Apr. 22, 2025, the entire contents of which is hereby incorporated by reference.

FIELD

Embodiments of the present disclosure generally relate to the field of visual display systems, selective visual display for a computer system, display devices, visual interfaces, vehicle routing optimization, and more specifically, embodiments relate to devices, systems and methods for improved integration of guidance input into an automated vehicle routing optimization computational system.

INTRODUCTION

Vehicle routing problem (VRP) solutions can be grouped into two example categories: fully automated solutions and manual/semi-automated solutions. Fully automated solutions automatically generate optimal routes based on predefined constraints (e.g., distance, time windows, capacity). Manual or semi-automated solutions capture and process user input to adjust individual stops in a predefined sequence using drag-and-drop or prioritization rules.

There are technical challenges relating to incorporating local knowledge or user preferences into an efficient process of computing optimized routes. Fully automated solutions can efficiently compute optimized routes, but they lack flexibility when local knowledge or user preferences need to be integrated. Conversely, manual solutions allow for flexibility, but they require tedious adjustments, making them impractical for large-scale fleet operations.

Accordingly, there exists a need for systems and methods that allow for capturing user input at an interface to provide guidance and parameters to influence the optimization process in real-time for computing an optimized vehicle route. There also exists a need for visual display systems and user interfaces that are intuitive and user-friendly to capture input for complex backend processes.

SUMMARY

Embodiments described herein provide an improved selective visual display system that can enhance user interaction by selectively presenting visual information based on specific criteria or attributes, such as map visualizations, which enable capturing of input for processing. The captured and processed input can trigger further updates for the selective visual display system.

Described herein are systems and methods for selective visual display of guided input vehicle routing optimization. In an aspect, there is provided systems and methods that involve receiving a freeform shape input on a map interface, translating the freeform shape input into spatial constraints for automated route optimization, generating an optimized route based on adherence to the freeform shape input, the spatial constraints, and efficiency factors, displaying the optimized route on the map interface, receiving adjustments to the freeform shape input for real-time modification and recalculation of the optimized route, and updating the display on the map interface. Systems and methods described herein provide improved user interfaces for capturing guidance input for vehicle routing optimization, and to devices, systems and methods for improved integration of guidance input into a map interface and automated vehicle routing optimization computational system.

Embodiments described herein provide a method for selective visual display of a computer map interface. The method involves: receiving a freeform shape input on a map visualization of a map interface; translating the freeform shape input into spatial constraints for automated route optimization for the map visualization; generating an optimized route based on adherence to the freeform shape input, the spatial constraints, and efficiency factors; displaying the optimized route on the map visualization of the map interface; and receiving adjustments to the freeform shape input for real-time modification and recalculation of the optimized route, and updating the display of the map visualization.

In some embodiments, translating the freeform shape input into spatial constraints involves inferring a directional path from the freeform shape input, where the freeform shape input comprises a start location relative to a displayed map with a plurality of end locations relative to the displayed map.

In some embodiments, the generating comprises minimizing a penalty function of a planned route to generate the optimized route, the penalty function comprising travel time, distance, and a shape-adherence penalty proportional to at least a distance from the freeform shape input to the planned route.

In some embodiments, translating the freeform shape input into spatial constraints comprises converting the freeform shape into geocoordinate line segments and a directional path.

In some embodiments, the freeform shape input comprises one or more of a sweeping curve, a loop, or a linear path.

In some embodiments, generating the optimized route involves using the weight parameters to prioritize the freeform shape input, over the spatial constraints, and the efficiency factors.

In some embodiments, generating the optimized route involves providing the freeform shape input as soft constraints to a VRP solver.

Embodiments described herein provide a method for selective visual display of a computer map interface. The method involves: receiving a freeform shape input on a map visualization of a map interface; translating the freeform shape input into spatial constraints for automated route optimization for the map visualization; generating an optimized route based on adherence to the freeform shape input, the spatial constraints, and efficiency factors; and displaying the optimized route on the map visualization of the map interface.

In some embodiments, translating the freeform shape input into spatial constraints involves inferring a directional path from the freeform shape input, where the freeform shape input comprises a start location relative to a displayed map with a plurality of end locations relative to the displayed map.

In some embodiments, the generating comprises minimizing a penalty function of a planned route to generate the optimized route, the penalty function comprising travel time, distance, and a shape-adherence penalty proportional to at least a distance from the freeform shape input to the planned route.

In some embodiments, translating the freeform shape input into spatial constraints comprises converting the freeform shape into geocoordinate line segments and a directional path.

In some embodiments, the freeform shape input comprises one or more of a sweeping curve, a loop, or a linear path.

In some embodiments, generating the optimized route involves using the weight parameters to prioritize the freeform shape input, over the spatial constraints, and the efficiency factors.

In some embodiments, generating the optimized route involves providing the freeform shape input as soft constraints to a VRP solver.

In some embodiments, the method involves receiving adjustments to the freeform shape input for real-time modification and recalculation of the optimized route, and updating the display of the map visualization.

Embodiments described herein provide a computer map system for vehicle routing optimization. The system has a computer device with a hardware processor having a graphical user interface (GUI) configured to: display a map visualization; provide one or more input tools to permit drawing and capture of directional input on the map visualization; receive a freeform shape input on the map visualization; display an optimized route on the map visualization; receive adjustments to the freeform shape input for triggering real-time modification and re-computation of the optimized route; and update the display of the map visualization based on a modified optimized route. The system has a non-transitory memory storing one or more machine learning models, weight parameters, and historical adjustments of map drawn input. The system further has a processing system of one or more hardware processors programmed with executable instructions and with a communication path to the non-transitory memory. The one or more hardware processors are configured to: translate the freeform shape input into spatial constraints for automated route optimization for the map visualization; generate the optimized route based on adherence to the freeform shape input, the spatial constraints, and efficiency factors; provide the optimized route to the computer device with the map interface; dynamically update the optimized route by adapting the weight parameters for the one or more machine learning models based on feedback or adjustments to the freeform shape input captured by the map interface, and the historical adjustments; and provide a modified optimized route to the computer device with the map interface.

In some embodiments, the freeform shape input comprises a start location relative to a displayed map with a plurality of end locations relative to the displayed map, where the processing system infers a directional path from the freeform shape input.

In some embodiments, the freeform shape input comprises drawn line segments, where the processing system converts the drawn line segments into geocoordinate line segments and a directional path.

In some embodiments, the freeform shape input comprises one or more of a sweeping curve, a loop, or a linear path.

In some embodiments, the processing system and the one or more machine learning models generates the optimized route by using the weight parameters to prioritize the freeform shape input, over the spatial constraints, and the efficiency factors.

In some embodiments, the processing system provides the freeform shape input as soft constraints to a VRP solver.

Embodiments described herein provide a non-transitory computer-readable medium to store instructions, which when executed by a computer, cause the computer to perform operations. The operations include: receiving a freeform shape input on a map visualization of a map interface; translating the freeform shape input into spatial constraints for automated route optimization for the map visualization; generating an optimized route based on adherence to the freeform shape input, the spatial constraints, and efficiency factors; displaying the optimized route on the map visualization of the map interface; and receiving adjustments to the freeform shape input for real-time modification and recalculation of the optimized route, and updating display of the map visualization.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Described herein are systems, methods and interfaces to integrate user-interface captured guidance input into the process of computing optimized vehicle routes, according to some embodiments. The user-interface captured guidance input can be a freeform shape path or direction flow on a map visualization, for example.

Advantages of the systems and methods described herein include efficient and intuitive interface to capture specific guidance input, and faster, more intuitive adjustments to routing optimization while maintaining efficiency. Embodiments described herein provide greater control, efficiency, and preferential intuitive editing for user interfaces, reducing the need for manual overrides while still ensuring optimized route calculations.

This system provides a method for a map interface that updates with visualizations corresponding to vehicle routing. Potential applications and use cases include for dispatchers and route planners in fields such as logistics, last-mile delivery, and fleet management solutions.

As an example application, a dispatcher can use this system to prioritize major roads and the improved user interface can capture input corresponding to a directional flow on a map visualization that avoids unnecessary turns through small streets. As another example application, a planner can use this system to ensure deliveries follow a logical geographic flow rather than jumping across different areas. As another example application, a last-mile logistics manager can use this system to designate preferred delivery corridors while maintaining optimized travel sequences.

As another example application, a dispatcher can use this system to incorporate driver preferences. Through experience, a driver may have formed a preference of travelling with a specific directionality (e.g., east to west). In other cases, a driver may like to end their route in a particular area because it is, for example, close to home or close to a location they want to visit after their shift.

There are technical challenges relating to capturing local knowledge or user preferences as input on a graphical user interface (GUI) and integrating different input sources into an efficient process of computing optimized routes. Embodiments described herein provide flexibility when local knowledge or user preferences need to be integrated with other data sources. Embodiments described herein do not require tedious adjustments, providing a practical application for large-scale fleet operations. Embodiments described herein provide systems and methods that allow users to provide guidance as input to influence the optimization process in real-time for computing an optimized vehicle route.

Embodiments proposed herein can provide systems, processes and computer readable media for integration of user-provided directional flow input as a soft constraint into the computation of optimized routes.

Figure 1:
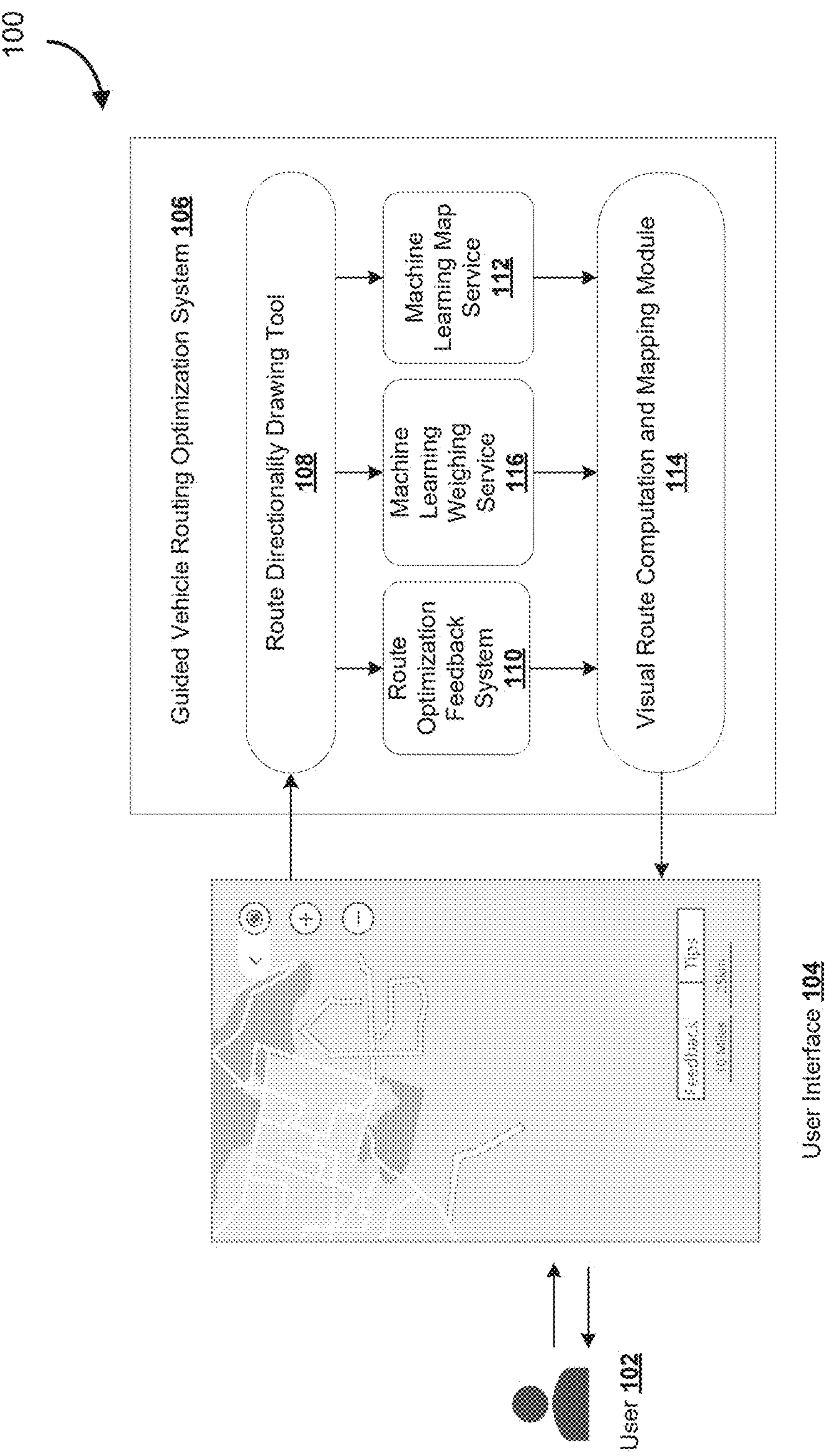
FIG. 1 shows an example system for implementation of vehicle routing optimization with guidance input according to some embodiments.

FIG. 1 shows an example system 100 for implementation of vehicle routing optimization with guidance input according to some embodiments.

An example digital map interface 104 is configured to display a map visualization and capture freeform drawings of lines on a map to indicate directionality. A directional path can start anywhere on the map visualization which indicates where the route should start roughly. The directional path can input a plurality of stop locations, for example. The system 100 can infer the directionality from the drawn shape on the map visualization. In some embodiments, the directional path can be a plurality of drawn line segments, and the system 100 converts the drawn line segments into geocoordinate line segments based on an overlay of the freeform shape onto existing maps, for example. The input data captured by the digital map interface 104 can be used to define constraints for route optimization.

In some embodiments, the optimization system 106 represents a user-drawn freeform shape as an ordered polyline P={p1, p2, . . . , pk} of geographic coordinates in a projected coordinate system, where each consecutive pair (pi, pi+1) defines a directed segment with a unit normal and tangent. In some embodiments, a directionality score D(s) is computed for each candidate stop s and each segment (pi, pi+1) as a function of: (i) the distance of s to the segment centerline (i.e., the length of the perpendicular line joining s and a line segment), (ii) the projection of s onto the segment tangent, and (iii) the monotonicity of s along the cumulative arc length of P (i.e., whether the line P is getting further and closer to s along its arc length). The optimization system 106 aggregates directionality scores across segments to yield a global adherence score that penalizes backtracking and cross-overs while rewarding progression along the drawn flow.

In some embodiments, the segmentation resolution of user-drawn freeform shapes by the optimization system 106 to yield the ordered polyline P depends on one or more of: the available computing resources, complexity of local route planning tasks, and statistical features of the user drawn shape, which can include number of vertices, curvature variance, average segment length (if drawn in segments), fraction of stops intersected by segments, and drawing duration. In some embodiments, the above factors may be collected and compiled by the route directionality drawing tool 108 operating in concert with the user interface 104 in real time.

As a non-limiting example, for low granularity inputs (e.g., two or three coarse points indicating "west-to-east"), the optimization system 106 allocates less processing power and sets segmenting resolution low to preserve solver freedom; and for high granularity inputs (e.g., continuous and complex freeform lines with multiple turns), optimization system 106 allows for a higher segmentation resolution to preserve information content from user input at the cost of additional computing resources.

A user 102 can provide a freeform shape input or drawing of a line or sketch of a shape or directional flow on a map displayed on a user interface 104. In some embodiments, the freeform shape input or drawing is one of a sweeping curve, a loop, or a linear path. System 100 allows users 102 to sketch a preferred directional path to provide input for the optimization system 106 instead of manually adjusting individual stops. User 102 can use a route directionality drawing tool 108 of the optimization system 106 to sketch a freeform shape path representing their preferred route directionality on digital map interface 104. In an alternative embodiment, user 102 may choose to input points of interest by tapping or clicking. The subsequent points are then joined by the optimization system 106 into a machine-readable shape input P with subsidiary line vectors defined by sequential two-dimensional map coordinates. The user 102 can start their drawing or sketch anywhere on the map on user interface 104, and the starting point will indicate where the route should start, approximately.

The interface 104 is configured to provide drawing tool 108 on a map visualization, and the tool 108 is activated and moved relative to the map visualization to capture a directional path relative to the displayed map visualization. The directional path has a start position and an end position relative to the displayed map visualization, and a path between the start position and the end position with different direction changes to provide a directional flow as input data. The user interface 104 provides the captured input data to the optimization system 106.

Optimization system 106 uses the user-provided freeform shape input to infer the user's 102 preferred directionality for an optimized route on the map. The captured inputs can define drawn line segments. The captured input is converted by optimization system 106 into a set of spatial constraints. The set of spatial constraints can be separate from the road network in the map. In some embodiments, the set of spatial constraints are directional vectors or geocoordinate line segments. In some embodiments, the set of spatial constraints include weighted zones and preferred road segments.

In some embodiments, the optimization system 106 supports mixed guidance primitives beyond polylines, including polygonal zones and no-go corridors. Polygons drawn around neighborhoods are interpreted as preferred zones, and the visual route computation and mapping module 114 boosts stop assignments and path choices that remain within these zones. No-go corridors drawn along certain streets are translated into edge-level penalties or temporary blacklists in the underlying road network graph, allowing users to avoid problematic areas such as construction sites or roads with low clearance.

The optimization system 106 takes the user-drawn freeform shape input as a soft constraint and provides this input to the visual route computation and mapping module 114. Visual route computation and mapping module 114 can use other route planning rules, such as minimizing distance, but also prioritizes conformity to the drawn input. The optimization system 106 sends the drawn input to dynamic machine learning map service 112 which has one or more machine learning models and weight parameters. The machine learning map service 112 provides time-of-day travel times between each of the stops as driven on the actual road network. In some embodiments, the optimization system 106 includes a machine learning weighing model 116 that interprets the user-provided input and acts as a weighing system to balance between strict adherence to the factors of user-provided input and route efficiency defined by the route planning rules. In some embodiments, the machine learning map service 112 and visual route computation and mapping module 114 can override time-window constraints to prioritize optimizing for overall efficiency instead of only scheduling routes that strictly comply with the time-window constraints. Once an initial route is generated by visual route computation and mapping module 114, the optimization system 106 provides an optimized route to the user interface 104 for display and to receive further input or feedback from user 102. That is, user interface 104 displays a visualization of the optimized route on the map visualization of the map interface. The display visually indicates the optimized route.

In some embodiments, the optimization system 106 constructs a dynamic corridor by buffering polyline P with a variable width b that can vary along arc length based on local map context, such as road density, presence of arterial roads, and historical travel-time variance. Stops and candidate edges falling outside the corridor incur proportionally larger penalties as the out-of-bounds distance increases. The buffer b may be computed using a learned function b of road class, time of day, and congestion index, enabling tighter adherence in grid networks and looser adherence in sparse suburban networks.

In some embodiments, optimization system 106 implements the soft constraint to the routing objective using a weighted penalty function based on how closely the planned route follows the drawn shape. The system calculates a shape adherence by summing deviations for each edge, considering both angle differences from the shape's tangent and lateral distance from its corridor. The machine learning weighing model 116 minimizes penalty function representing travel time, distance, violation penalties (e.g., delivery time window requirements, fleet capacities, task urgencies), and a tunable weight based on user intent.

In some embodiments, optimization system 106 adjusts the tunable user intent weight automatically: low-detail shapes (i.e., vague segments made up of a few points) result in a wide corridor and high flexibility; while high-detail shapes (i.e., dense array of points or intersecting stops) narrows the resulting corridor, balancing the route planning towards resulting routes that more closely following the input shape. These are illustrative examples and other adjustments can be made.

In some embodiments, the machine learning map service 112 ingests stop coordinates, timestamps, and contextual features (e.g., weather, road works) and outputs an ETA matrix with uncertainty intervals. The optimization system 106 incorporates these ETAs into its cost model and propagates uncertainty through the adherence penalties by widening corridor buffers when forecast variance is high, thereby reducing the risk of overfitting to a brittle shape under volatile conditions.

In some embodiments, the optimization system 106 provides the user-drawn freeform shape input as soft constraints to a VRP solver.

In some embodiments, the user 102 may decide to redraw their path and user interface 104 captures the new input for provision to the optimization system 106. Upon receiving a new user-provided input, optimization system 106 will send the new path input to the route optimization feedback system 110 to dynamically recalculate the route in real-time, allowing for real-time modification and recalculation of the optimized route. Route optimization feedback system 110 can provide visual feedback on deviations from the initial route, allowing users to tweak constraints interactively through the user interface 104. The visual feedback can be provided as overlays on the map visualization for example. The capture input path can also be shown as overlays on the map visualization.

In some embodiments, revised computation in response to a redrawn shape proceeds as a full re-optimization with warm starts. The optimization system 106 preserves incumbent routes, parameter weights, and cached travel-time matrices, and seeds the solver with a feasible solution derived by reordering only those subsequences whose shape adherence cost exceeds a threshold. This reduces latency while ensuring global convergence properties comparable to a cold start.

In some embodiments, the optimization system 106 provides feedback (e.g. as a visualization for user interface 104) on the difference between an initial route generated based on an initial input and a new route generated in real-time based on an updated input. The visual feedback can be provided as an overlay on the map visualization. As further examples, the feedback can include comparisons of drive time, mileage, and number of constraints being violated/satisfied based on the resulting routes from the human-drawn shapes. In some embodiments, the user interface 104 enables a user 102 to provide input to undo the updated input and new route to re-display the initial input and route on the user interface 104. The user 102 may wish to undo the updated input if the feedback provided by optimization system 106 indicates that the new route is significantly less efficient, for example.

In some embodiments, the user interface 104 can receive batch modifications (e.g. as input data) across multiple routes to the optimization system 106, instead of per-stop adjustments (see FIG. 5 below).

In some embodiments, batch guidance across multiple routes is supported by assigning each drawn shape a route identifier and color attribute. The optimization system 106 partitions the stop set into route-specific subsets by solving an assignment problem that maximizes cumulative adherence across shapes subject to fleet size, capacities, and shift duration constraints. Within each partition, the optimization system 106 then solves the sequencing problem with the shape-specific soft constraints derived from driver input. Where shapes overlap, the system arbitrates using a priority policy or a fairness criterion that balances adherence across routes.

In some embodiments, optimization system 106 stores repeated patterns in user-provided input for certain regions as historic input, adjustments or feedback. This historic data can be used by optimization system 106 for its one or more machine learning models (e.g., machine learning weighing service 116). For example, if a user is always drawing a line from west to east in the Vancouver downtown region, then the system will learn this pattern and store it for future routing tasks in the same area.

In some embodiments, optimization system 106 maintains a history in persistent storage 614 (see FIG. 6 below) of user-drawn shapes and accepted routes keyed by geography, user, fleet, and time-of-day. A preference learning module derives region-specific priors over user preference weighing, corridor width, and sequencing motifs (e.g., clockwise loops in specific districts). Upon detecting that a new routing task falls within a known preference region, the system pre-populates a suggested directional polyline and corresponding weights, which the user 102 can adjust or overwrite. Accepted adjustments update the priors to adapt to evolving preferences.

The machine learning map service 112 prioritizes and balances between adherence to the user-provided freeform shape input, route distance, and route time when computing an optimized route for a routing task. The routing tasks differ based on the required stops and user-inputted constraints. All stops for the routing tasks are assumed to be included in the user-provided input. In some embodiments, the user can unschedule or remove some stops from the routing task before providing a freeform drawing for directionality for the remaining required stops for the routing tasks. Depending on how many line segments are drawn by the user and how far the drawn line segments are located from the stops for the routing task, the machine learning map service 112 balances the factors of distance, adherence to the user-provided input and time differently.

The optimization system 106 enables selective visual display at user interface 104. The user interface 104 is intuitive and user-friendly while still capturing specialized input for complex backend processes of the optimization system 106. This user interface 104 is for providing a seamless experience for user 102 to interact with optimization system 106 and manage settings and parameters. Designing user interfaces for devices involves challenges related to both hardware and software. This includes ensuring compatibility and seamless interaction between different devices and platforms. The system 100 improves usability. Applications can be overloaded with features, making them confusing and hard to use. The user interface 104 is improved and more personalized for vehicle routing optimization, while still capturing precise and accurate input for processing.

The system 100 improves visual displays for vehicle routing optimization. The optimization system 106 has a computer device with a hardware processor that couples to user interface 104 configured to display a map visualization. The optimization system 106 provides one or more input tools 108 to permit drawing and capture of directional input on the map visualization at user interface 104. The user interface 104 receives a freeform shape input on the map visualization, and selectively updates to display an optimized route on the map visualization. The user interface 104 can receive adjustments to the freeform shape input for triggering real-time modification and re-computation of the optimized route by the optimization system 106. The output is used to update the display of the map visualization at user interface 104 based on a modified optimized route. The system 106 has a non-transitory memory storing one or more machine learning models, weight parameters, and historical adjustments of map drawn input. The system 106 further has a processing system of one or more hardware processors programmed with executable instructions and with a communication path to the non-transitory memory. The one or more hardware processors are configured to: translate the freeform shape input into spatial constraints for automated route optimization for the map visualization; generate the optimized route based on adherence to the freeform shape input, the spatial constraints, and efficiency factors; provide the optimized route to the computer device with the map interface; dynamically update the optimized route by adapting the weight parameters for the one or more machine learning models based on feedback or adjustments to the freeform shape input captured by the map interface, and the historical adjustments; and provide a modified optimized route to the user interface 104 for updating the map visualization.

Figure 2:
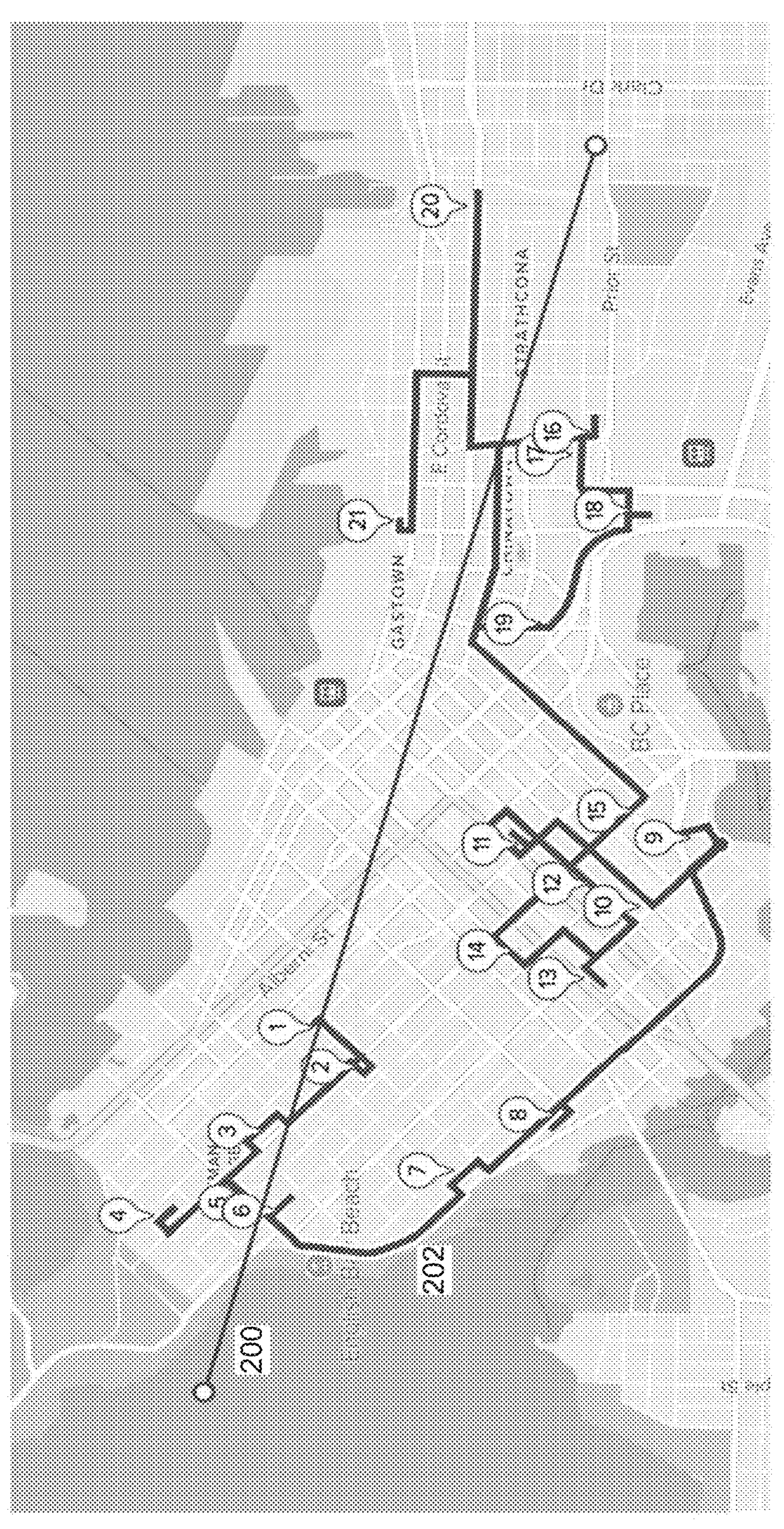
FIG. 2 is a diagram of an example guidance input and a corresponding computed route displayed on a map at an interface, according to some embodiments.

FIG. 2 is a diagram of an example freeform shape input (or guidance input) displayed as an input visualization 200 (or overlay) and a corresponding computed route displayed as a route visualization 202 on a map visualization at an interface 104, according to some embodiments. A freeform shape refers to a graphical element that allows user interface 104 to create and manipulate shapes without predefined constraints, or custom shapes relative to the displayed map visualization. The freeform shapes can be drawings of lines on a map to indicate directionality. These shapes can start anywhere and are converted into geocoordinate line segments, disconnected from the road network. The system infers directionality from the drawn shape, allowing users to dictate the sequence of routes by drawing line segments that connect stops.

In FIG. 2, the example freeform shape input captured by user interface 104 is a directional path (displayed as an input visualization 200) defined by a single line moving from west to east relative to a map visualization. The directional path is also defined by a start location and an end location. In some embodiments, the directional path can include a plurality of stop locations. For this user-provided input, the optimization system 106 computes a route that begins roughly in the west area of the map and ends roughly in the east area of the map while allowing optimization system 106 flexibility to optimize for efficiency. Accordingly, the route is not required to start and end as the same start location and end location of the captured input, and the directional flow can be used to generate constraints for the route.

Figure 3:
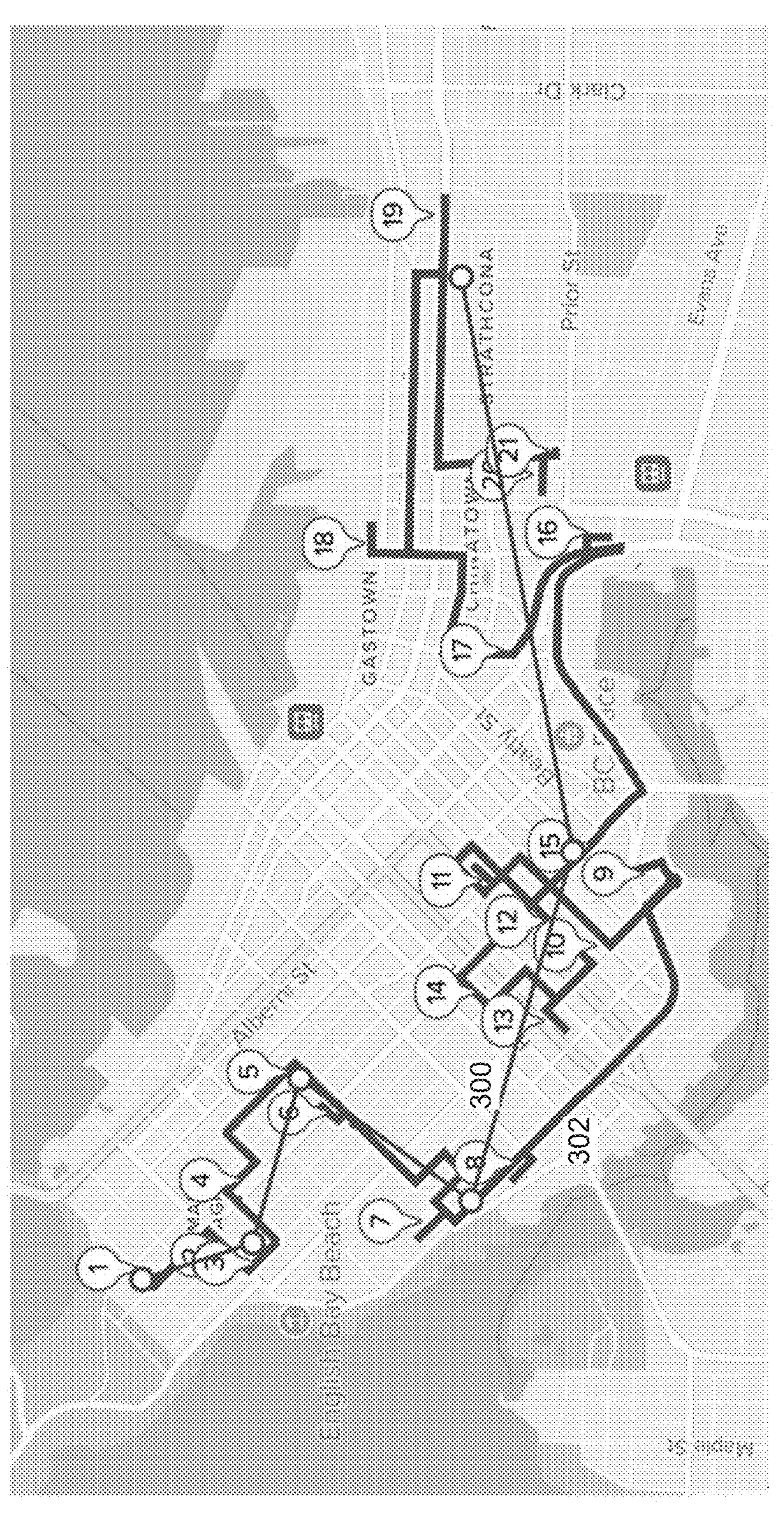
FIG. 3 is a diagram of another example freeform shape input and a corresponding computed route displayed on a map at an interface, according to some embodiments.

FIG. 3 is a diagram of another example freeform shape input captured by user interface 104 is a directional path (displayed as an input visualization 300 overlay on a map visualization) and a corresponding computed route (displayed as a route visualization 302 overlay on a map visualization) at an interface 104, according to some embodiments.

In FIG. 3, the example freeform shape input captured by user interface 104 comprises more granular line segments with detailed directionality. This user-provided input provides more detailed directional data which is used to direct the optimization process. This example provides more directional data than the input from FIG. 2. The optimization system 106 computes a route that adheres to constraints generated by the user-provided input.

Figure 4:
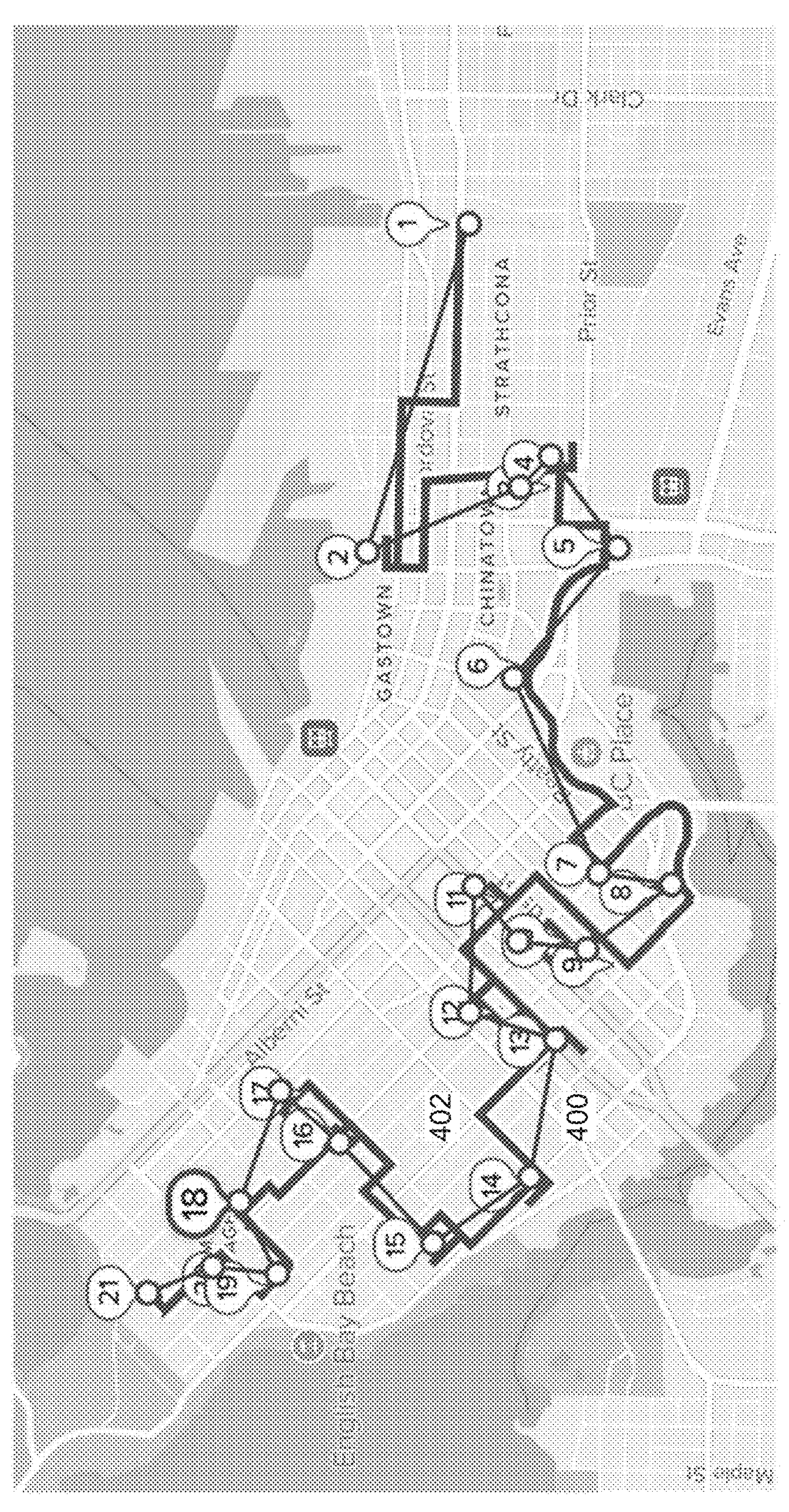
FIG. 4 is a diagram of another example freeform shape input and a corresponding computed route displayed on a map at an interface, according to some embodiments.

FIG. 4 is a diagram of another example freeform shape guidance input (displayed as an input visualization 400 overlay on a map visualization) and a corresponding computed route (displayed as a route visualization 402 overlay on a map visualization) at an interface 104, according to some embodiments.

In FIG. 4, the example guidance input captured by user interface 104 comprises line segments that connect a plurality of stops on the map visualization. In this scenario, the user-provided input gives the user 102 full control over the sequence of stops, and the optimization system 106 computes a route that adheres to constraints generated using data defined by the sequence of stops. This user-provided freeform shape input provides more detailed directional data as captured input. In some embodiments, because the line segments present in the user-provided input are detailed enough to encompass each individual stop, the optimization system 106 would have no further room left for optimization, resulting in simply outputting a path with the sequence of stops that the user provided.

Figure 5:
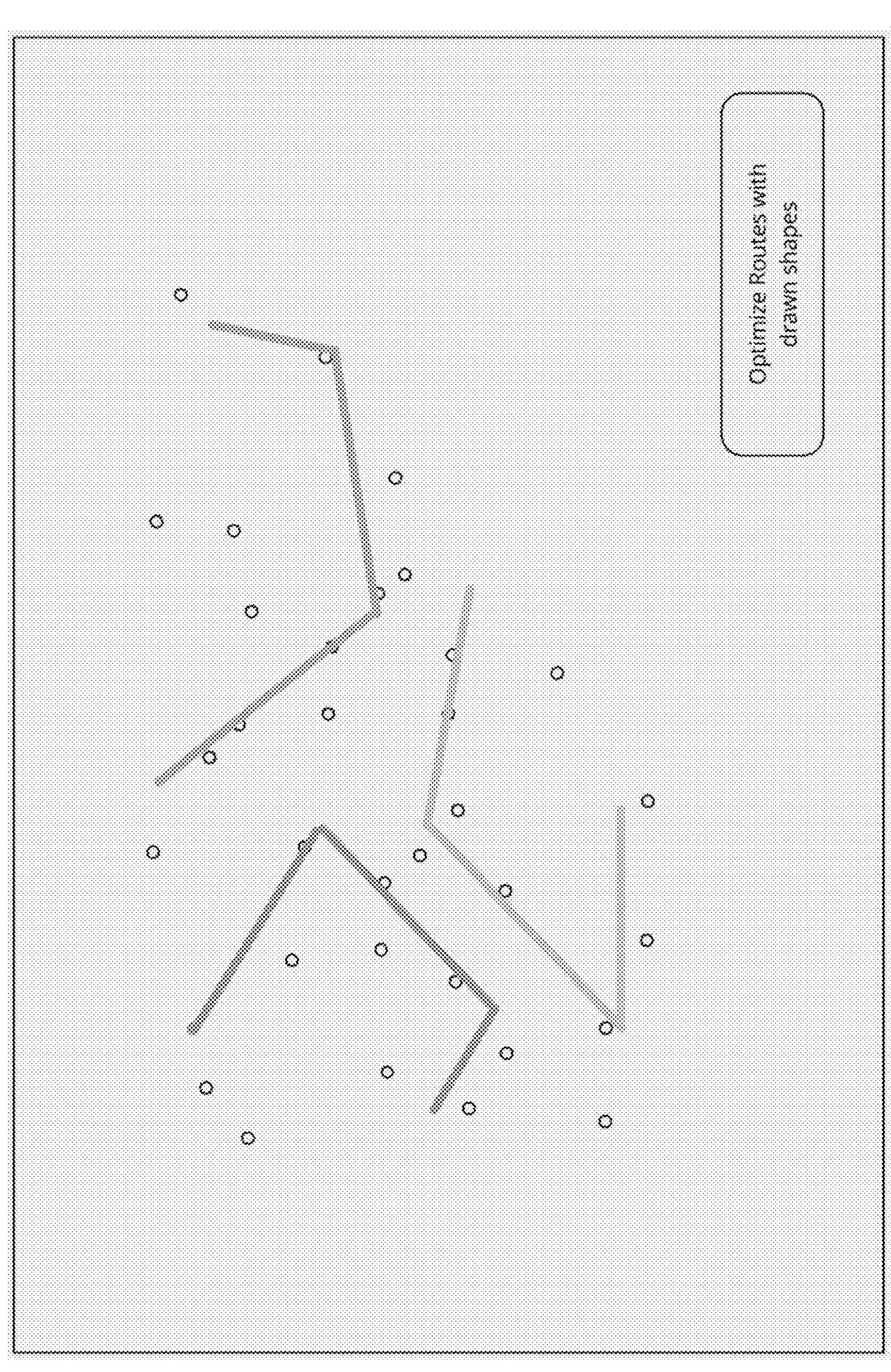
FIG. 5 is a diagram of example batch guidance inputs displayed at an interface, according to some embodiments.

FIG. 5 is a diagram of example batch guidance inputs (or directional paths) displayed at an interface, according to some embodiments.

In some embodiments, user interface 104 enables the user 102 to select a colour (e.g., red, yellow, green) to represent a particular route, and has drawing tools to draw line shapes on a map visualization. The user can then switch colours to draw another line shape for another route, which can be useful for dispatchers handling route generation tasks for multiple drivers. The different paths or routes do not have to be continuous or connected. This enables the user interface 104 to capture multiple input paths and not just on single routes. Instead of re-optimizing a single selected route with user-provided freeform shape input, optimization system 106 can capture multiple line segments for multiple routes simultaneously, which instructs the optimization system 106 to route the user to specific areas while also instructing the directionality of the route simultaneously. For example, a user can draw a directional flow shape for a route represented using the colour black, then select a different route colour of blue and draw a second directional flow shape for the second route. The user interface 104 captures the different directional flows for processing. Once the directional flow shapes are drawn, the optimization system 106 can create optimized routes globally.

In some embodiments, the optimization system 106 implements driver-side interaction distinct from dispatcher-side batch guidance on their respective user interface 104. For a single driver route on a mobile device, the user interface 104 provides a finger-draw tool with haptic and visual cues. Drawn input is converted to a local micro-corridor around the driver's remaining stops, and the solver recomputes only the remainder of the route beyond the current location. To ensure safety, in some embodiments, the system defers recomputation until the device detects a stationary state or a connected vehicle interface signals a stop.

In some embodiments, the system supports selective constraint pinning that allows users to fix certain stops or sub-sequences while applying shape guidance to the remainder. The solver enforces pinned subsequences as hard precedence constraints and evaluates shape adherence only on the unpinned segments. This hybrid approach facilitates preserving contractual commitments or regulatory requirements while still benefiting from directional guidance.

In some embodiments, the optimization system 106 exposes tunable policy profiles, such as efficiency-first, adherence-first, and balanced. Each profile defines a mapping from route characteristics (stop density, time window tightness) to the weight schedule. The system may automatically switch profiles when it detects that a shape implies a near-complete sequencing (e.g., high curvature alignment with many stops), thereby avoiding unnecessary solver exploration. In some embodiments, the dispatcher-side user interface may provide interactable input modules for the dispatcher to explicitly select policy profiles to guide route calculations. For example, if the delivery fleet is operating under time and resource constraints, the dispatcher may choose to enact a strictly efficiency-first policy, prohibiting all driver-side drawn preferences that do not maximize the overall delivery efficiency across the fleet.

The freeform shape input captured by user interface 104 for each route can be stored and re-used for future routing tasks and drawings. In some embodiments, the optimization system 106 instantiates and executes a machine learning map service 112 that is trained on historical input lines and directional flow shapes that the user has drawn previously to infer user preferences over time and incorporate them into route computation processes without needing further user-provided input. In some embodiments, optimization system 106 stores the historical data in memory (e.g., memory 608 in FIG. 6) for application and use in future routing tasks.

Figure 6:
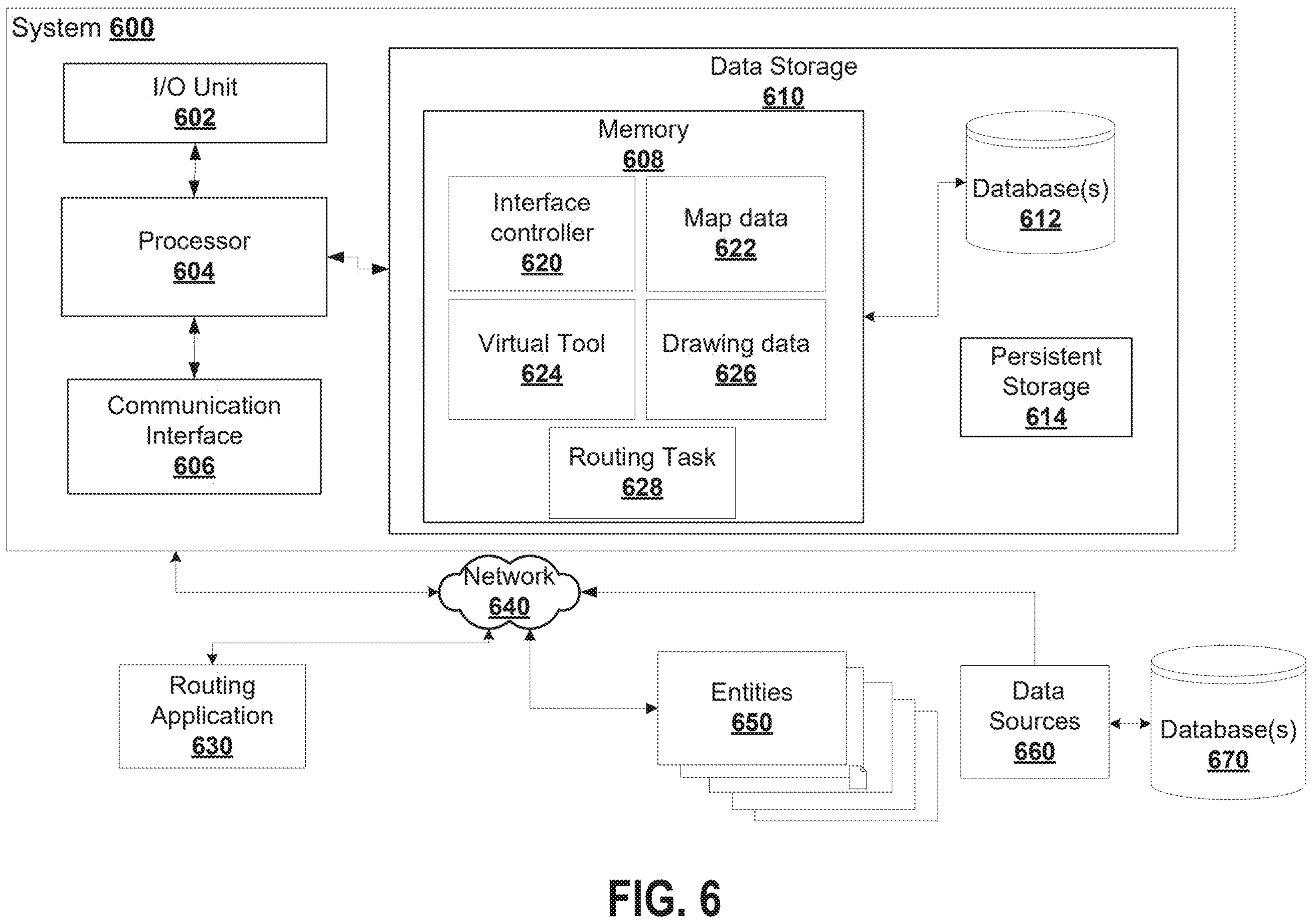
FIG. 6 is a diagram of an example system for vehicle routing optimization with guidance input, according to some embodiments.

FIG. 6 is a diagram of an example system for vehicle routing optimization with guidance input, according to some embodiments.

The system 600 can include an I/O Unit 602, a processor 604, communication interface 606, and data storage 610. The processor 604 can execute instructions in memory 608 to implement aspects of processes described herein. The processor 604 can execute instructions in memory 608 to configure an interface controller 620 for generating and managing the interface (e.g. map interface 104) for displaying map data 622, one or more virtual tools 624 for the map interface 104 for capturing input such as by defining lines and generating drawing data 626, and other functions described herein. The system 600 may be software (e.g., code segments compiled into machine code), hardware, embedded firmware, or a combination of software and hardware, according to various embodiments.

In some embodiments, the system 600 can implement one or more routing tasks 628 using the map data 622 and drawing data 626. In some embodiments, the system 600 can connect to one or more routing applications 630 that can use the drawing data 626 to define regions with the map data 622 for various tasks. In some embodiments, the routing task 628 can be integrated with the routing application 630 to exchange data and control commands. In some embodiments, the system 600 can connect to one or more entities 650 that can implement different map related processes, that can receive map data 622 and drawing data 626, and/or that can display the interface with virtual tool 624, for example. The system 600 can connect to data sources 660 to receive map data 622, for example.

The I/O unit 602 can enable the system 600 to interconnect with one or more client devices or input devices, such as a keyboard, mouse, camera, touch screen and a microphone, and/or with one or more output devices such as a display screen and a speaker. An input device can be used to control the virtual tool 624 at the interface and define drawing data 626 relative to map data 622 displayed at the interface. The input device can be used to generate touch input data and movement data, for example. The system 600 can be distributed with multiple processors 604 and I/O units 602 to enable remote capture of input.

The interface controller 620 can trigger the display of a user interface on a display device. The user interface can display a map image (or a portion thereof) from map data 622. The user interface can enable selection of the map (or a portion thereof) from map data 622. The interface controller 620 can activate the virtual tool 624 at the interface to define a drawing or line. The virtual tool 624 can be controlled by commands received from interaction between the input device and the interface. The interface controller 620 can trigger the display of an indicator for the virtual tool relative to the map data. The virtual tool 624 can be displayed as a graphical object such as a pointer, marker, and the like. The interface controller 620 can trigger the display of a graphical representation of a source image and a graphical representation of the indicator for the virtual tool relative to the image data.

The interface controller 620 can receive, from the interface, a first input data point at a first location relative to the map (or a portion thereof). The capture of the first input data point data can be triggered by actuation of the input device. This can be a click, selection, or a touch of the input device, for example. The first input data point can define a starting location for the drawing/line. The input device can be integrated with a touch display, for example, and the first input data point can be referred to as a first touch input.

The interface controller 620 can receive, from the interface, movement input in a direction relative to the first location. The movement input can be defined by movement commands from the input device during the actuation of the input device and a release of the actuation of the input device. This can be a drag or swipe from the first location, for example. The movement input can define a line or a freeform shape or a directional flow from (and relative to) the first location. The movement input can be in the direction of west to east on the map, for example.

The interface controller 620 can receive, from the interface, a second input data point at a second location relative to the map. The capture of the second input data point can be triggered by release of the actuation of the input device. This can be releasing a drag or swipe movement on the input device, for example. The second input data point can define an ending location for the drawing/line.

The interface controller 620 can trigger display, at the interface, of a graphical object representing the drawing/line as an overlay of the map data. The start and end points of the drawing/line are defined by the first location and the second location. In particular, the first location indicates the start point of the drawing and the second location can indicate the end point of the drawing. The drawing has a line connecting the start and end points. The drawing/line can be defined by the direction of the movement input, and in particular, the directional flow of the drawing relative to the start and end point can be based on the movement input.

The interface controller 620 can receive the freeform shape input data from the interface and transform the input data into a drawing data format. The interface controller 620 can compile the input into code representing the drawing data format. The transformed input data can define a drawing record. The drawing record can be linked with the map. For example, the drawing record can include metadata that includes a map identifier, for example. The interface can store the drawing record as drawing data 626. Different metadata can be stored in association with the drawing.

The interface controller 620 can receive a command from the input device indicating actuation of virtual tool 624 (e.g. first input data point) at a first location and movement of the virtual tool 624 from the first location to another location (movement input) while the virtual tool 624 is actuated (e.g. click, hold click while dragging input device to a new location). For example, the input data can be defined as a first click of the input device and drag of the virtual tool 624 from $P_{1,start}$ to $P_{1,end}$. The interface can receive a command indicating that the virtual tool 624 is released (e.g. no longer actuated) at a second location (e.g., second input data point). For example, the second input data can be defined as a release of the first click of the input device at $P_{1,end}$. The interface can provide the freeform shape input data to the interface controller 620 to compute the drawing/line.

The virtual tool 624 provides a flexible tool to define the drawing/line or freeform shape based on a set of input data that can define the line drawing. The input data can be efficiently provided by the user to the system 600 as a freeform shape.

The processor 604 can save a drawing record (as part of the drawing data 626) for the drawing with metadata with an identifier for the map data that was displayed at interface with the line as defined using the virtual tool 624.

The processor 604 can compute the drawing in a line format using the first input data point, the movement input, and the second input data point. For example, the format can define a start point at the first location, an end point at the second location, and a line connecting the start point and end point by the movement input. The movement input can be from the first location towards any direction on the map.

The processor 604 can dynamically update the interface to display a line between the first location and a current location of the virtual tool when defining the movement input. The processor 604 can dynamically update the interface to display a line defined by the first location, the movement input and a current location of the virtual tool when defining the second input data point and prior to the second actuation of the input device.

The processor 604 can extract a region of interest from the map data defined by the drawing/line, and save the extracted region of interest in data storage 610 as part of the map data 622. The processor 604 can transmit the extracted region to routing task 628, routing application 630, or entity 650, for example.

The processor 604 can be, for example, any type of general-purpose microprocessor or microcontroller, a digital signal processing (DSP) processor, an integrated circuit, a field programmable gate array (FPGA), a reconfigurable processor, or any combination thereof.

Memory 608 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 610 can include memory 608, databases 622 and 626, and persistent storage 614.

The communication interface 606 can enable the system 600 to communicate with other components, to exchange data with other components, to access and connect to network resources, to serve applications, and perform other computing applications by connecting to a network 640 (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The system 600 can be operable to register and authenticate users (using a login, unique identifier, and password for example) prior to providing access to applications, a local network, network resources, other networks and network security devices. The system 600 can connect to different machines, entities 650, and/or data sources 660 (linked to databases 670).

The data storage 610 may be configured to store information associated with or created by the system 600, such as map data 622 and drawing data 626. The data storage 610 may be a distributed storage system, for example. The data storage 610 can implement databases, for example. Storage 610 and/or persistent storage 614 may be provided using various types of storage technologies, such as solid state drives, hard disk drives, flash memory, and may be stored in various formats, such as relational databases, non-relational databases, flat files, spreadsheets, extended markup files, and so on.

In some embodiments, the data structures used to store drawing data 626 include a polyline table with columns for route_id, user_id, geometry (encoded as a compressed polyline string), timestamps, per-vertex confidence, and derived features such as curvature and local stop density. The system 600 stores these records in a spatially indexed database to enable rapid retrieval of historical shapes intersecting a region of interest and to support analytics on guidance usage patterns.

Figure 7:
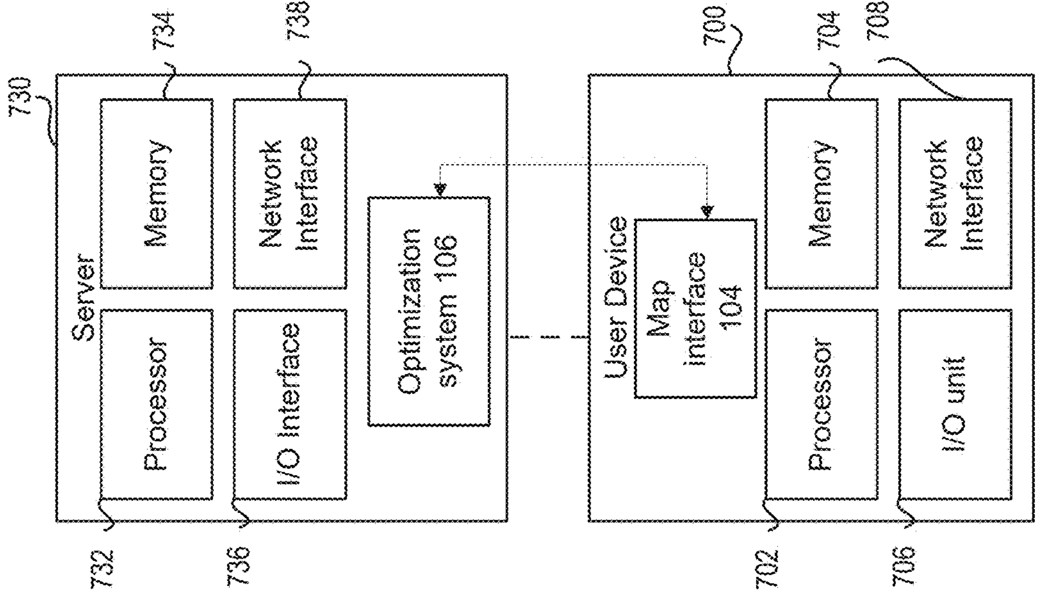
FIG. 7 is a diagram of another example system for vehicle routing optimization with guidance input, according to some embodiments.

FIG. 7 is a diagram of another example system for vehicle routing optimization with guidance input, according to some embodiments. System can include a server 730 with optimization system 106 and a user device 700 with map interface 104.

The user device 700 can include an I/O Unit 706, a processor 702, network interface 708, and memory 704. The processor 702 can execute instructions in memory 704 to implement aspects of processes described herein. The processor 702 can execute instructions in memory 702 to configure an interface controller for generating and managing the interface 104 for displaying map data, one or more virtual tools for the map interface 104 for capturing input such as by defining lines and generating drawing data, and other functions described herein. The user device 700 may be software (e.g., code segments compiled into machine code), hardware, embedded firmware, or a combination of software and hardware, according to various embodiments.

In some embodiments, the server 730 with optimization system 106 can implement one or more routing tasks using the map data and drawing data. In some embodiments, the user device 700 has one or more routing applications that can use the drawing data to define regions with the map data displayed at interface 104 for various tasks. In some embodiments, routing tasks can be integrated with a routing application to exchange data and control commands with server 730.

The I/O unit 706 can enable the device 700 to interconnect with one or more input devices, such as a keyboard, mouse, camera, touch screen and a microphone, and/or with one or more output devices such as a display screen and a speaker. An input device can be used to control a virtual tool at the interface 104 and define drawing data relative to map data displayed at the interface 104. The input device can be used to generate touch input data and movement data, for example.

In some embodiments, the device 700 accommodates heterogeneous input modalities. On desktop, users may draw polylines with click-to-vertex input; on touch devices, freehand strokes are sampled into vertices at a rate adapted to finger velocity. The system normalizes all inputs to a canonical polyline representation with resampling to enforce a minimum and maximum inter-vertex distance, reducing noise while preserving intent-relevant curvature.

The interface 104 can have a controller to trigger the display of a map visualization on a display of the user device 700. The map interface 104 can display a map image (or a portion thereof) from map data. The map interface 104 can enable selection of the map visualization (or a portion thereof) from map data. The interface 104 can activate one or more virtual tools to define a drawing or line. A virtual tool can be controlled by commands received from interaction between the input device and the interface. The interface 104 can trigger the display of an indicator for the virtual tool relative to the map data. The interface 104 can display a virtual tool as a graphical object such as a pointer, marker, and the like. The interface 104 can trigger the display of a graphical representation of a source image and a graphical representation of the indicator for the virtual tool relative to the image data.

The interface 104 can receive a first input data point at a first location relative to the map (or a portion thereof). The capture of the first input data point data can be triggered by actuation of the input device. This can be a click, selection, or a touch of the input device, for example. The first input data point can define a starting location for the drawing/line. The input device can be integrated with a touch display, for example, and the first input data point can be referred to as a first touch input.

The interface 104 can receive movement input in a direction relative to the first location. The movement input can be defined by movement commands from the input device during the actuation of the input device and a release of the actuation of the input device. This can be a drag or swipe from the first location, for example. The movement input can define a line or a directional flow from (and relative to) the first location. The movement input can be in the direction of west to east on the map, for example.

The interface 104 can receive a second input data point at a second location relative to the map. The capture of the second input data point can be triggered by release of the actuation of the input device. This can be releasing a drag or swipe movement on the input device, for example. The second input data point can define an ending location for the drawing/line.

The interface 104 can trigger display of a graphical object representing the drawing/line as an overlay of the map data. The start and end points of the drawing/line are defined by the first location and the second location. In particular, the first location indicates the start point of the drawing and the second location can indicate the end point of the drawing. The drawing has a line connecting the start and end points. The drawing/line can be defined by the direction of the movement input, and in particular, the directional flow of the drawing relative to the start and end point can be based on the movement input.

The interface 104 can receive the input data and transform the input data into a drawing data format. The interface 104 can compile the input into code representing the drawing data format. The transformed input data can define a drawing record. The drawing record can be linked with the map. For example, the drawing record can include metadata that includes a map identifier, for example. The interface 104 can store the drawing record as drawing data in memory 704, or transmit the drawing data to server 730 for storage in its memory 734. Different metadata can be stored in association with the drawing.

The interface 104 can receive a command from the input device indicating actuation of virtual tool (e.g. first input data point) at a first location and movement of the virtual tool from the first location to another location (movement input) while the virtual tool is actuated (e.g. click, hold click while dragging input device to a new location). For example, the input data can be defined as a first click of the input device and drag of the virtual tool from $P_{1,start}$ to $P_{1,end}$. The interface 104 can receive a command indicating that the virtual tool is released (e.g. no longer actuated) at a second location (e.g., second input data point). For example, the second input data can be defined as a release of the first click of the input device at $P_{1,end}$. The interface 104 can provide the input data to the interface controller 620 to compute the drawing/line. The virtual tool provides a flexible tool to define the drawing/line based on a set of input data that can define the line drawing. The input data can be efficiently provided by the user to the system 600.

The I/O interface 736 of server 730 can implement some operations described in relation to I/O unit 706 of user device 700. Further, I/O interface 736 of server 730 can exchange data and commands with I/O unit 706 of user device 700.

The processor 702 can save a drawing record (as part of the drawing data) in memory 704 for the drawing with metadata with an identifier for the map data that was displayed at interface with the line was defined using the virtual tool. In some embodiments, the processor 702 can transmit the drawing data to server 730 for storage in its memory 734.

The processor 702 can compute the drawing in a line format using the first input data point, the movement input, and the second input data point. The processor 702 can dynamically update the interface 104 to display a line between the first location and a current location of the virtual tool when defining the movement input. The processor 702 can dynamically update the interface 104 to display a line defined by the first location, the movement input and a current location of the virtual tool when defining the second input data point and prior to the second actuation of the input device.

The processor 702 can extract a region of interest from the map data defined by the drawing/line, and save the extracted region of interest in memory 704 as part of the map data. The processor 702 can transmit the extracted region to routing task, routing application, or entity, for example.

The processor 702 can be, for example, any type of general-purpose microprocessor or microcontroller, a digital signal processing (DSP) processor, an integrated circuit, a field programmable gate array (FPGA), a reconfigurable processor, or any combination thereof.

Memory 704 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 704 can include databases and/or persistent storage.

The network interface 708 can enable the user device 700 to communicate with other components, to exchange data with other components, to access and connect to network resources, to serve applications, and perform other computing applications by connecting to a network.

The memory 734 of server 730 may be configured to store information associated with or created by the optimization system 106, such as map data 622 and drawing data 626. The memory 734 may be a distributed storage system, for example. The memory 734 can implement databases, for example. Memory 734 may be provided using various types of storage technologies, such as solid state drives, hard disk drives, flash memory, and may be stored in various formats, such as relational databases, non-relational databases, flat files, spreadsheets, extended markup files, and so on.

Figure 8:
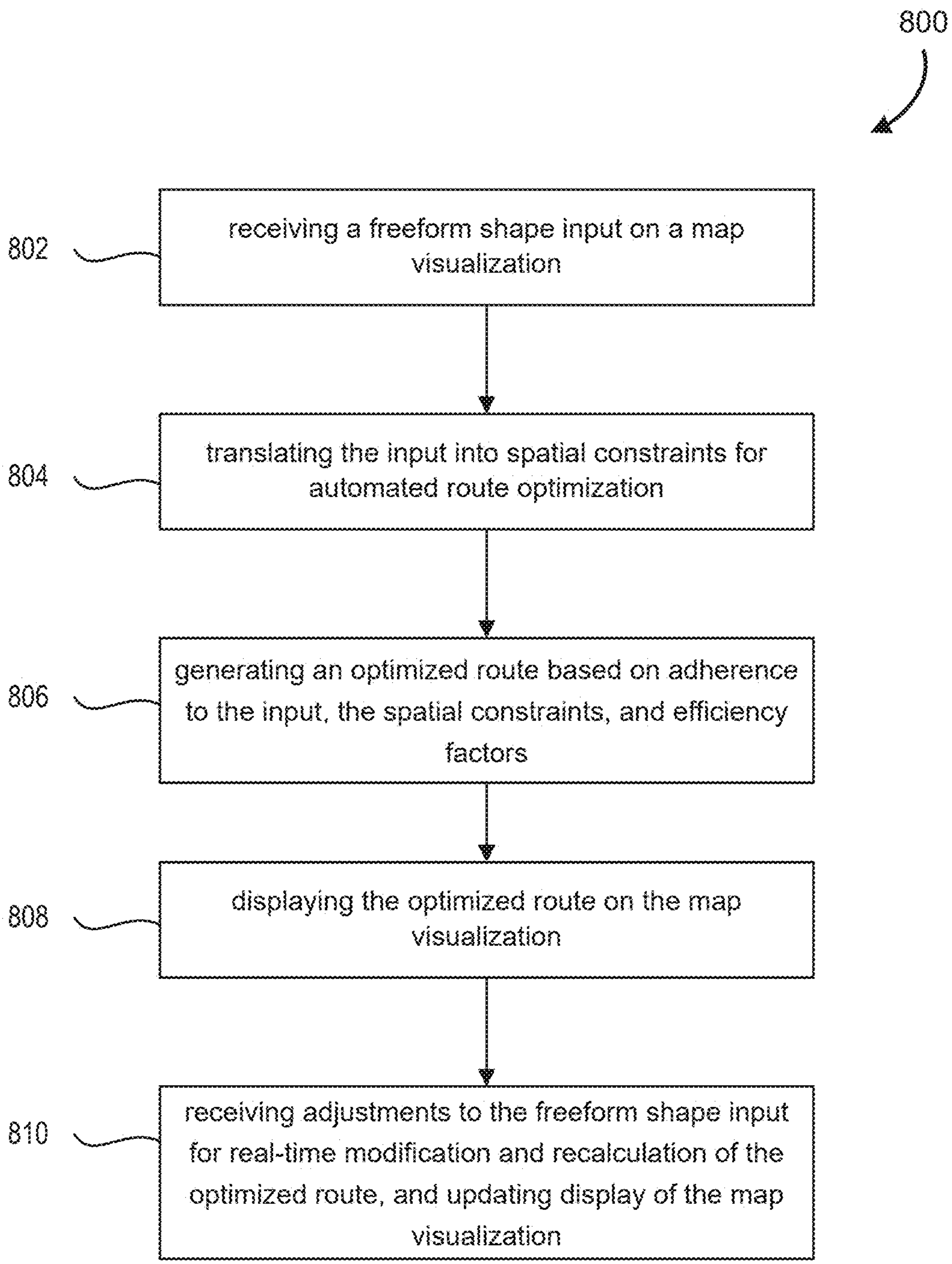
FIG. 8 is a diagram of an example process for vehicle routing optimization with guidance input, according to some embodiments.

FIG. 8 is a diagram of an example process for vehicle routing optimization with guidance input, according to some embodiments.

At 802, the method 800 involves receiving a freeform shape input on a map visualization of a map interface 104. A freeform shape at interface 104 refers to a graphical element that can create and manipulate shapes without predefined constraints.

At 804, the method 800 involves translating the input into spatial constraints for automated route optimization for the map visualization at the map interface 104. Spatial constraints refer to limitations or restrictions related to the position, area, and size of objects or elements within a given space. These constraints control how objects can be placed, moved, or interact within a defined environment. The spatial constraints are used to process the user-drawn input on the digital map displayed at interface 104. For example, freeform drawings of lines on a map are converted into geocoordinate line segments, which are disconnected from the road network. These constraints help in determining the directionality and sequence of routes based on the drawn shapes.

At 806, the method 800 involves generating an optimized route based on adherence to the input, the spatial constraints, and efficiency factors. Route optimization is the process of determining the most efficient travel paths for vehicles to follow, e.g. when delivering goods or providing services. This method 800 assesses variable elements such as traffic conditions, distance, delivery windows, and the number of stops. By employing route scheduling optimization, organizations can minimize travel time and costs while maximizing productivity (i.e. maximizing efficiency). Route optimization is a critical aspect of logistics and supply chain management that focuses on determining the most efficient routes for transportation while adhering to parameters captured as input by interface 104.

At 808, the method 800 involves displaying the optimized route on the map visualization of the map interface 104.

At 810, the method 800 involves receiving adjustments to the freeform shape input for real-time modification and recalculation of the optimized route, and updating display of the map visualization at the map interface 104.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references were made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The following discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A method for a computer map interface, the method comprising:

receiving a plurality of stop locations;

receiving a freeform shape input on a map visualization of a map interface;

translating the freeform shape input into spatial constraints for automated route optimization for the map visualization;

generating an optimized route by determining an optimal sequencing of a plurality of geocoordinate line segments based on adherence to the freeform shape input, the spatial constraints, the plurality of stop locations, and efficiency factors, the optimized route configured for the map visualization, wherein the optimized route comprises a sequence of stop locations, wherein generating the optimized route comprises providing the freeform shape input as soft constraints for determining the optimal sequencing, wherein the processing system converts the freeform shape input into an ordered polyline $P=\{p1, p2, \ldots, pk\}$ of geographic coordinates in a projected coordinate system, wherein each consecutive pair (pi, pi+1) defines a directed segment, wherein the processing system computes a directionality score D(s) for each candidate stop s and each segment (pi, pi+1) as a function of: (i) the distance of s to the segment centerline, (ii) the projection of s onto the segment tangent, and (iii) the monotonicity of s along the cumulative arc length of P, wherein the processing system aggregates directionality scores across segments to yield a global adherence score; and displaying the optimized route on the map visualization of the map interface.

2. The method of claim 1 further comprising receiving adjustments to the freeform shape input for real-time modification and recalculation of the optimized route, and updating the display of the optimized route on the map visualization.

3. The method of claim 1, wherein translating the freeform shape input into spatial constraints comprises inferring a directional path from the freeform shape input, wherein the freeform shape input comprises a start location relative to a displayed map with a plurality of end locations relative to the displayed map.

4. The method of claim 1, wherein generating an optimized route comprises minimizing a penalty function of a planned route, the penalty function comprising travel time, distance, and a shape-adherence penalty proportional to at least a distance from the freeform shape input to the planned route.

5. The method of claim 1, wherein translating the freeform shape input into spatial constraints comprises converting the freeform shape into geocoordinate line segments and a directional path.

6. The method of claim 1, wherein the freeform shape input comprises one or more of a sweeping curve, a loop, or a linear path.

7. The method of claim 1, wherein generating the optimized route comprises using the weight parameters to prioritize the freeform shape input, over the spatial constraints, and the efficiency factors.

8. A computer map system for vehicle routing optimization, the system comprising:

a computer device with a hardware processor having a graphical user interface (GUI) configured to:

receive a plurality of stop locations;

display a map visualization;

provide one or more input tools to permit drawing and capture of directional input on the map visualization;

receive a freeform shape input on the map visualization;

display an optimized route on the map visualization;

receive adjustments to the freeform shape input for triggering real-time modification and re-computation of the optimized route; and update the display of the map visualization based on a modified optimized route;

non-transitory memory storing one or more machine learning models, weight parameters, and historical adjustments of map drawn input; and a processing system of one or more hardware processors programmed with executable instructions and with a communication path to the non-transitory memory, wherein the one or more hardware processors:

translate the freeform shape input into spatial constraints for automated route optimization for the map visualization;

generate the optimized route by determining an optimal sequencing of a plurality of geocoordinate line segments based on adherence to the freeform shape input, the spatial constraints, the plurality of stop locations, and efficiency factors, wherein the optimized route comprises a sequence of stop locations, wherein the optimized route is generated by providing the freeform shape input as soft constraints for determining the optimal sequencing, wherein the processing system converts the freeform shape input into an ordered polyline P={p1, p2, . . . , pk} of geographic coordinates in a projected coordinate system, wherein each consecutive pair (pi, pi+1) defines a directed segment, wherein the processing system computes a directionality score D(s) for each candidate stop s and each segment (pi, pi+1) as a function of: (i) the distance of s to the segment centerline, (ii) the projection of s onto the segment tangent, and (iii) the monotonicity of s along the cumulative arc length of P, wherein the processing system aggregates directionality scores across segments to yield a global adherence score;

provide the optimized route to the computer device with the map interface;

dynamically update the optimized route by adapting the weight parameters for the one or more machine learning models based on feedback or adjustments to the freeform shape input captured by the map interface, and the historical adjustments; and provide a modified optimized route to the computer device with the map interface.

9. The system of claim 8 wherein the freeform shape input comprises a start location relative to a displayed map with a plurality of end locations relative to the displayed map, wherein the processing system infers a directional path from the freeform shape input.

10. The system of claim 8 wherein the freeform shape input comprises a plurality of drawn line segments, wherein the processing system converts the plurality of drawn line segments into geocoordinate line segments and a directional path.

11. The system of claim 8 wherein the freeform shape input comprises one or more of a sweeping curve, a loop, or a linear path.

12. The system of claim 8 wherein the processing system and the one or more machine learning models generates the optimized route by using the weight parameters to prioritize the freeform shape input, over the spatial constraints, and the efficiency factors.

13. The system of claim 8 wherein the processing system converts the freeform shape input to shape-specific soft constraints for determining the optimal sequencing for automated route optimization.

14. A non-transitory computer-readable medium to store instructions, which when executed by a computer, cause the computer to perform operations comprising:

receiving a freeform shape input on a map visualization of a map interface;

translating the freeform shape input into spatial constraints for automated route optimization for the map visualization;

generating an optimized route by determining an optimal sequencing of a plurality of geocoordinate line segments based on adherence to the freeform shape input, the spatial constraints, the plurality of stop locations, and efficiency factors, wherein the optimized route comprises a sequence of stop locations, wherein generating the optimized route comprises providing the freeform shape input as soft constraints for determining the optimal sequencing, wherein the processing system converts the freeform shape input into an ordered polyline P={p1, p2, . . . , pk} of geographic coordinates in a projected coordinate system, wherein each consecutive pair (pi, pi+1) defines a directed segment, wherein the processing system computes a directionality score D(s) for each candidate stop s and each segment (pi, pi+1) as a function of: (i) the distance of s to the segment centerline, (ii) the projection of s onto the segment tangent, and (iii) the monotonicity of s along the cumulative arc length of P, wherein the processing system aggregates directionality scores across segments to yield a global adherence score;

displaying the optimized route on the map visualization of the map interface; and receiving adjustments to the freeform shape input for real-time modification and recalculation of the optimized route, and updating the display of the map visualization.

15. The non-transitory computer-readable medium of claim 14, wherein translating the freeform shape input into spatial constraints comprises inferring a directional path from the freeform shape input, wherein the freeform shape input comprises a start location relative to a displayed map with a plurality of end locations relative to the displayed map.

16. The non-transitory computer-readable medium of claim 14, wherein the freeform shape input comprises a plurality of drawn line segments, wherein translating the freeform shape input into spatial constraints comprises converting the plurality of drawn line segments into geocoordinate line segments and a directional path.

17. The non-transitory computer-readable medium of claim 14, wherein the freeform shape input comprises one or more of a sweeping curve, a loop, or a linear path.

18. The non-transitory computer-readable medium of claim 14, wherein generating the optimized route comprises using the weight parameters to prioritize the freeform shape input, over the spatial constraints, and the efficiency factors.

19. The non-transitory computer-readable medium of claim 14, wherein generating the optimized route comprises converting the freeform shape input to soft constraints for determining the optimal sequencing for automated route optimization.

* * * * *